Patented May 11, 1937

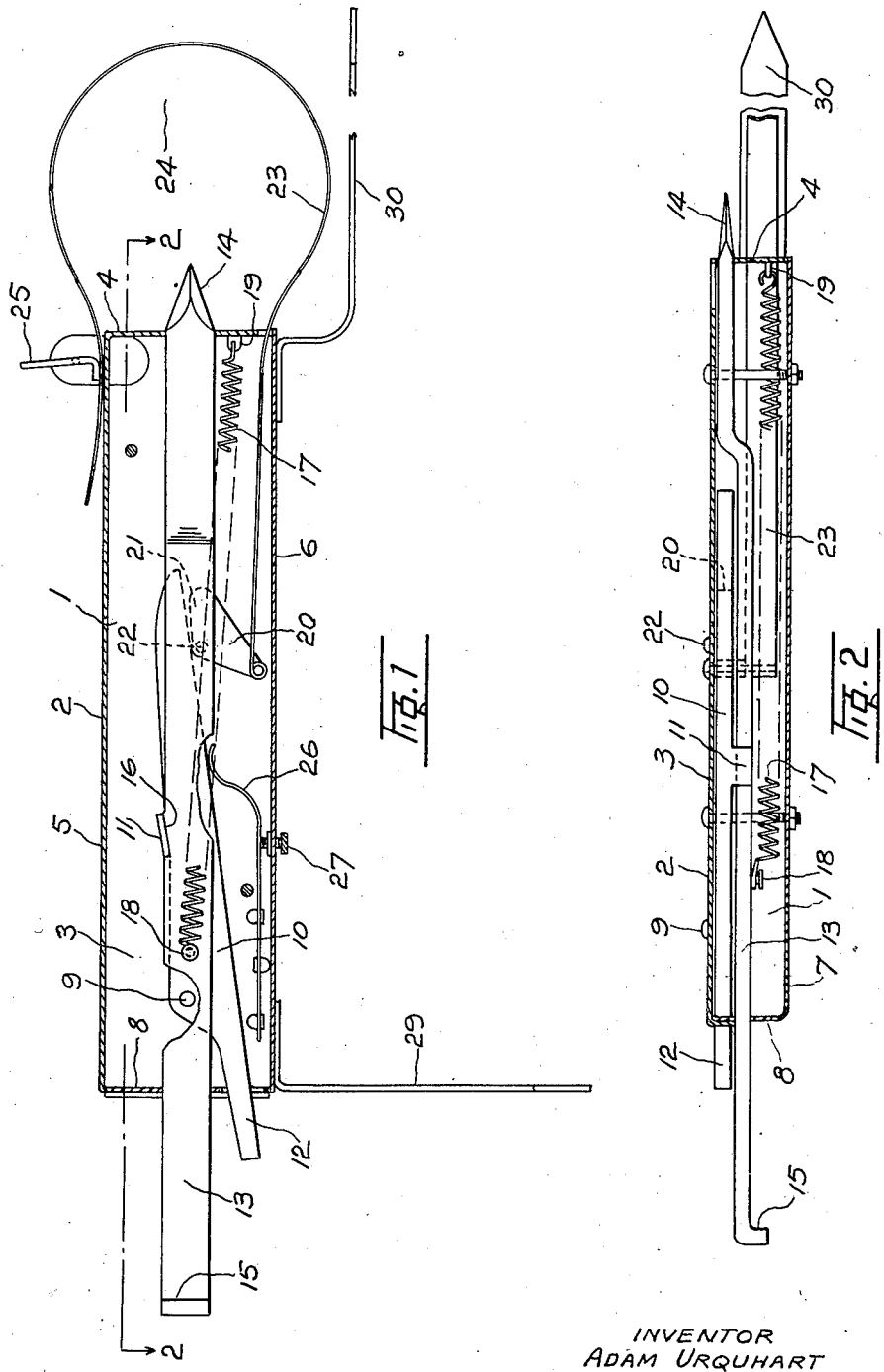

2,079,825

UNITED STATES PATENT OFFICE 2,079,825

ANIMAL TRAP

Adam Urquhart, Vancouver, British Columbia, Canada, assignor to Walter Holloway, Grahamvale, Canada Application September 21, 1936, Serial No. 101,745

7 Claims. (Cl. 43—79)

My invention relates to improvements in animal traps, the objects of which are to provide means whereby the animal caught will be quickly and humanely killed by thrusting a spear through its throat. A further object is to provide means whereby frost and snow will not impair the functioning of the trap, and still further objects are to provide means whereby the trap may be easily set without danger to the trapper, and whereby the trap noose may be conveniently adjusted to catch only the animals desired. A further important object is to provide means whereby the effort required to set the trap off can be varied at will.

The invention consists essentially of a trap body having a noose extending therefrom and carrying a spear which is adapted to be spring projected towards the centre of the noose in response to a pull being exerted upon said noose, as will be more fully described in the following specification and shown in the accompanying drawing, in which:—

Fig. 1 is a longitudinal section of the invention.

Fig. 2 is a sectional view taken on the line 2—2 of Figure 1.

In the drawing like characters of reference indicate corresponding parts in each figure.

The numeral 1 indicates a body portion consisting of a rectangular casing 2 having a rear wall 3, an end wall 4 and top and bottom walls 5 and 6 respectively, also a front cover 7 having an end wall 8.

Mounted on a pin 9 extending from the rear wall 3 is a lever 10 having a latch 11 intermediate its length and a finger 12 extending outwardly beyond the casing.

Slidably mounted in the end walls 4 and 8 is a bar 13 having a spear point 14 at one end and a hooked member 15 at its opposite end by which the spear point 14 is retracted to set the trap. The bar is provided with a substantially V-shaped notch 16 in which the latch 11 is adapted to rest when the trap is in set position. The bar is adapted to be urged in one direction by a coil spring 17 anchored at one end by a pin 18 extending from the bar and at the opposite end to a hook 19 preferably stamped out of the material forming the end wall 4.

A trigger 20 is pivotally mounted on the rear wall 3 having a cam 21 at one end which is adapted to engage the inner end of the lever 10 as the trigger is rocked about its pivot pin 22, shown in dotted line in Figure 1.

Extending from the lower end of the trigger 20 is a metal tape or wire 23 which extends outwardly through the end wall 4 and is formed into a noose 24 with its free end clamped against the top wall 5 of the casing 2 by a clip or other suitable fastening 25.

Where the trap is to be used for trapping a variety of different animals, it is desirable that the release mechanism should be adjustable, so that the trap may be set off with a light or heavy pull on the noose as may be desired. To provide such adjustment I provide a spring 26 which exerts an upward thrust upon the lever 10, the pivotal point of which is so disposed with relation to the latch 11 that the spring 17 tends to hold the latch in the notch 16. Bearing upwardly under the spring 26 is a thumb screw 27 which is accessible from outside the casing, so that by turning the screw 27 in the appropriate direction the lift of the spring can be increased to reduce the effort required to lift the latch out of the notch 16.

In order that the trap may be suitably supported two spikes 29 and 30 extend from the body portion 1, the spike 29 is thrust into the ground when the trap is to be used horizontally and the spike 30 is similarly used when the trap is to be supported vertically with the noose 24 projecting downwardly.

The operation of the trap is as follows, the diameter of the noose 24 is set by adjusting the free end of the wire 23 in the desired position by the clip 25. When a tension is put on the noose 24, the trigger 20 is rocked and its cam 21 raises the bar 10 until the latch 11 is out of the notch 16, thus permitting the spring 17 to thrust the spear point 14 forwardly into the noose.

To reset the trap, the bar 13 is withdrawn by pulling upon the hook 15 until the latch 11 is in register with the notch 16. If the trap is held in a horizontal position as shown, the latch will drop into position, but if not, it suffices to lift slightly on the finger 12 which will move the lever and drop the latch into the position shown.

What I claim as my invention is:

1. An animal trap comprising a body, a spear head projectable from the body by spring means, means for holding the spear head in retracted position and a noose normally projecting beyond the body adapted on being strained by an animal entering said noose to release the holding means and release the spear for projection beyond the body.

2. An animal trap comprising a body having a spear head projectable from the body, a spring for urging the spear head into projected position, a trigger within the body for releasing the spear head to be projected, and a noose connected at one end to the body and at the other end to the trigger, said noose being adapted on being put under strain by an animal to pull the trigger and release said spear head for projection beyond the body.

3. An animal trap comprising a body, a spear head projectable from the body by spring means, a trigger adapted to normally hold the spear head in retracted position and to release said spear head when being pulled in one direction, and a noose secured at one end to the body and at the opposite end to the trigger.

4. An animal trap comprising a body, a spear head projectable from the body by spring means, a trigger adapted to normally hold the spear head in retracted position and to release said spear head when being pulled in one direction, a noose secured at one end to the trigger and a clip upon the body for adjustably connecting the opposite end of said noose to the body.

5. An animal trap consisting of a body, a spear head projectable from the body by spring means, a trigger for releasing the spear head from retracted position, a noose connected with the body and the trigger adapted on being put under strain to release the spear head into projected position, and means remote from the noose for retracting said spear head.

6. An animal trap consisting of a body, a spear head projectable from the body by spring means, a trigger for releasing the spear head from retracted position, a noose connected with the body and the trigger adapted on being put under strain to release the spear head into projected position, and means for varying the strain required to be applied to the noose to release the spear head.

7. An animal trap consisting of a body, a spear head projectable from the body by spring means, a trigger for releasing the spear head from retracted position, a noose connected with the body and the trigger adapted on being put under strain to release the spear head into projected position and a spring adapted to reduce the strain required to be applied to the noose to release the spear head.

ADAM URQUHART.